United States Patent
Broderick et al.

(10) Patent No.: US 11,033,851 B2
(45) Date of Patent: Jun. 15, 2021

(54) POLYMERS CONTAINING AROMATIC DICARBOXYLIC ACID

(71) Applicant: UOP LLC, Des Plaines, IL (US)

(72) Inventors: Erin Marie Broderick, Arlington Heights, IL (US); Francis Stephen Lupton, Evanston, IL (US); Hayim Abrevaya, Wilmette, IL (US)

(73) Assignee: UOP LLC, Des Plaines, IL (US)

( * ) Notice: Subject to any disclaimer, the term of this patent is extended or adjusted under 35 U.S.C. 154(b) by 52 days.

(21) Appl. No.: 16/586,944

(22) Filed: Sep. 28, 2019

(65) Prior Publication Data
US 2020/0024387 A1 Jan. 23, 2020

Related U.S. Application Data

(60) Provisional application No. 62/650,243, filed on Mar. 29, 2018.

(51) Int. Cl.
| | |
|---|---|
| *C08L 23/06* | (2006.01) |
| *B01D 53/04* | (2006.01) |
| *B01D 53/14* | (2006.01) |
| *C10G 53/08* | (2006.01) |
| *C10G 25/00* | (2006.01) |
| *C10G 21/20* | (2006.01) |
| *B01D 53/26* | (2006.01) |
| *C08G 63/16* | (2006.01) |

(52) U.S. Cl.
CPC ..... *B01D 53/0423* (2013.01); *B01D 53/1493* (2013.01); *B01D 53/263* (2013.01); *C08G 63/16* (2013.01); *C10G 21/20* (2013.01); *C10G 25/003* (2013.01); *C10G 53/08* (2013.01); *B01D 2252/204* (2013.01); *B01D 2252/2023* (2013.01); *B01D 2253/20* (2013.01); *B01D 2257/304* (2013.01); *B01D 2257/504* (2013.01); *B01D 2257/80* (2013.01); *C10G 2300/1096* (2013.01); *C10G 2300/207* (2013.01)

(58) Field of Classification Search
USPC ......... 524/17, 21, 24, 35; 525/240; 528/305, 528/307, 308.3
See application file for complete search history.

(56) References Cited

U.S. PATENT DOCUMENTS

2015/0079867 A1* 3/2015 Milizia ................. C08G 63/16
442/327

* cited by examiner

*Primary Examiner* — Terressa Boykin
(74) *Attorney, Agent, or Firm* — Paschall & Associates, LLC; Mark Goldberg

(57) ABSTRACT

A process is provided for making a polymer comprising providing a mixture of at least one furandicarboxylic acid, at least one diol, and at least one C2-C3 dicarboxlic acid, ester derivatives of C2-C3 dicarboxylic acid, hydroxy fatty acid or ester derivative of a hydroxy fatty acid; adding a catalyst and processing said mixture at reaction conditions until a polymer product is produced. The polymer consists of random units based upon the starting materials that are used.

18 Claims, No Drawings

POLYMERS CONTAINING AROMATIC DICARBOXYLIC ACID

In 2017, 301 million metric tons of plastic were produced from predominantly petrochemical feedstocks with 39% being single use plastics and only 10% of all plastics are recycled. Since this paradigm is not sustainable, the idea of a circular plastic economy has emerged. The basis of a circular plastic economy is to design out waste and pollution, keep products and materials in use so that they never become waste, and to regenerate natural systems. Several strategies to achieve a sustainable polymer economy are under investigation, such as the production of biobased and biodegradable plastics. One commercial example of a biodegradable polymer is poly(butylene) adipate terephthalate (PBAT). While poly(butylene) terephthalate is a non-biodegradable polymer, the addition of the adipic acid monomer to the reaction mixture increased the biodegradability of the material. In the current disclosure, an approach is taken to synthesize polymers with the bio-based 2,5-furandicarboxylic acid instead of the petrochemical based p-terephthalic acid to achieve bio-based biodegradable polymers and also to potentially increase the biodegradability of current polymers. Biodegradable polymers are a class of polymer that breaks down after its intended use, often by activity by bacteria, into natural byproducts.

SUMMARY

The synthesized polymer is a random copolymer comprising three main units, a bio-based aromatic, a diol, and a dicarboxylic acid, to compose a polyester. The properties and applications of the polymers are dependent upon the composition of the monomers. The potential applications may range from a replacement for polyethylene to polyethylene terephthalate, which are both commonly used polymers in single use plastics. A polymer is made that comprises random units from furandicarboxylic acid, at least one diol and at least one C2-C3 dicarboxylic acid or hydroxy fatty acid with a catalyst under reaction conditions. The process of making this polymer comprises providing a mixture of at least one furandicarboxylic acid, at least one diol, and at least one C2-C3 dicarboxlic acid, ester derivatives of C2-C3 dicarboxylic acid, hydroxy fatty acid or ester derivative of a hydroxy fatty acid; adding a catalyst and processing the mixture at reaction conditions such as temperatures between about until a polymer product is produced.

DETAILED DESCRIPTION

A polymer is produced that is a reaction product of furandicarboxylic acid, at least one diol, and at least one C2-C3 dicarboxlic acid or hydroxy fatty acid with a catalyst. The furandicarboxylic acid may be an isomer selected from 2,5-furandicarboxylic acid, 2,4-furandicarboxylic acid, 2,3-furandicarboxylic acid or a diester of the acid selected from dimethyl ester furandicarboxylate or diethyl ester furandicarboxylate. The diol may be an aliphatic hydrocarbon diol or a cyclic diol and the C2-C3 dicarboxylic acid may be oxalic acid or malonic acid.

The process of making the polymer comprises providing a mixture of at least one furandicarboxylic acid, at least one diol, and at least one C2-C3 dicarboxlic acid, ester derivatives of C2-C3 dicarboxylic acid, hydroxy fatty acid or ester derivative of a hydroxy fatty acid; adding a catalyst and processing the mixture at reaction conditions until a polymer product is produced. The polymer has as repeating units a random combination of the three main components. The furandicarboxylic acid may be an isomer of furandicarboxylic acid such as 2,5-furandicarboxylic acid, 2,4-furandicarboxylic acid, and 2,3-furandicarboxylic acid or a diester of furandicarboxylic acid such as dimethyl ester furandicarboxylate or diethyl ester furandicarboxylate. The diols that are used include an aliphatic hydrocarbon diol, a cyclic diol or mixtures thereof. The aliphatic hydrocarbon diol may be selected from ethylene glycol, propylene glycol, and butane diol. The cyclic diol may be cyclohexane diol. The C2-C3 dicarboxylic acid can include oxalic acid or malonic acid and esters of oxalic acid and malonic acid such as dimethyl oxalate, dimethyl malonate diethyloxalate and diethyl malonate.

The hydroxy fatty acid is selected from 3-hydroxyvaleric acid, 4-hydroxybutryic acid, ricinoleic acid, 12-hydroxyoctadecanoic acid, 16-hydroxyhexadecanoic acid, 17-hydroxyoctadecanoic acid, 9,10-epoxy-18-hydroxyoctadecanoic acid, and 9,10,18-trihydroxyoctadecanoic acid. The reaction conditions include a temperature from about 100° C. to 350° C., 100° C. to 250° C. or 100 to 230° C. depending upon the particular reactants used and pressures from less than ambient pressure to 100 atm less than ambient to 50 atm, less than ambient to 25 atm or less than ambient to 5 atm. Pressure may be reduced from 1 atm via vacuum during a latter period of the reaction. The reaction may have a duration from 1 second to 24 hours, 1 minute to 24 hours, 1 minute to 12 hours, 1 minute to 6 hours or 1 minute to 1 hour. The catalysts that may be used are selected from metal oxides and metal alkoxide catalysts. The metal alkoxides are selected from titanium alkoxides, tin alkoxides, germanium alkoxides, antimony alkoxides and mixtures thereof. The metal alkoxide catalysts may be ethoxides, propoxides isopropoxides, butoxides, isobutoxides and ter-butoxides. The ratios of materials used include furandicarboxylic acid and C2-C3 dicarboxylic acid being present at a ratio of from 0.01:1 to 1:0.1 or from 0.1:1 to 1:0.1 The process may be a continuous, semi batch or batch process.

In order to more fully illustrate the invention, the following examples are set forth. It is to be understood that the examples are only by way of illustration and are not intended as an undue limitation on the broad scope of the invention as set forth in the appended claims.

EXAMPLE 1

In a 20 mL vial with a stir bar, 1,4-butanediol (11 mol equiv.), malonic acid (3.9 mol equiv.), and 2,5-furandicarboxylic acid (1 mol equiv.) were combined with titanium tetra(isopropoxide) (0.033 mol equiv.) as the catalyst. After applying vacuum, the vial was flushed with nitrogen. Under flowing nitrogen, the vial was placed in a heater block on a hot plate. The reaction was stirred at 150 rpm at 110° C. for 1 hour. Then, the reaction was heated to 135° C. for 1.5 hours and then at 180° C. for 1.5 hours. Lastly, the mixture was heated to 210° C. for 1 hour under vacuum. In order to obtain the product from the vial, chloroform was added to the vial to dissolve the product. The chloroform slurry was transferred to a Teflon liner for an autoclave. The chloroform was evaporated. $^1$H NMR spectroscopy in $CDCl_3$ had the following product peaks: 7.22 ppm (2 H), 4.4-4.09 ppm (10.7 H), 3.4 ppm (2.64 H), 2.0-1.6 ppm (11.38 H) The melting point was around 94° C. and the decomposition temperature (mass loss of 5 wt %) was 250° C. Gel permeation chromatography indicated a $M_w$ of 11,100 (compared to polystyrene standards) and a PDI of 3.1.

EXAMPLE 2

In a 20 mL vial with a stir bar, 1,4-butanediol (11 mol equiv.), ricinoleic acid (0.3 mol equiv.), and 2,5-furandicarboxylic acid (1 mol equiv.) were combined with titanium tetra(isopropoxide) (0.095 mol equiv.) as the catalyst. After applying vacuum, the vial was flushed with nitrogen. Under flowing nitrogen, the vial was placed in a heater block on a hot plate. The reaction was stirred at 150 rpm at 110° C. for 1 hour. Then, the reaction was heated to 135° C. for 1.5 hours and then at 180° C. for 1.5 hours. Lastly, the mixture was heated to 210° C. for 1 hour under vacuum. In order to obtain the product from the vial, chloroform was added to the vial to dissolve the product. The chloroform slurry was transferred to a Teflon liner for an autoclave. The chloroform was evaporated. $^1$H NMR spectroscopy in $CDCl_3$ had the following product peaks: 7.26-7.1 ppm (6.0 H), 5.47 ppm (1.15 H), 5.39 ppm (1.37 H), 5.13 ppm (1.0 H), 4.5-4.0 ppm (16.5 H), 2.6-1.47 ppm (34.3 H), 1.47-1.0 ppm (21.4 H), 1.0-0.64 ppm (4.0 H). The melting point was 131° C. and the decomposition temperature (mass loss of 5 wt %) was 284° C. Gel permeation chromatography indicated a $M_w$ of 17,143 and a PDI of 5.6.

EXAMPLE 3

In a 20 mL vial with a stir bar, 1,4-butanediol (11 mol equiv.), 16-hydroxyhexadecanoic acid (0.32 mol equiv.), and 2,5-furandicarboxylic acid (1 mol equiv.) were combined with titanium tetra(isopropoxide) (0.11 mol equiv) as the catalyst. After applying vacuum, the vial was flushed with nitrogen. Under flowing nitrogen, the vial was placed in a heater block on a hot plate. The reaction was stirred at 150 rpm at 110° C. for 1 hour. Then, the reaction was heated to 135° C. for 1.5 hours and then at 180° C. for 1.5 hours. Lastly, the mixture was heated to 210° C. for 1 hour under vacuum. In order to obtain the product in a manipulatable form, chloroform was added to the vial to dissolve the product. The chloroform slurry was transferred to a Teflon liner for an autoclave. The chloroform was evaporated. $^1$H NMR spectroscopy in $CDCl_3$ had the following product peaks: 7.24-7.13 ppm (2 H), 4.5-4.0 ppm (5.6 H), 2.32 ppm (0.74 H), 2.08-1.49 ppm (6.66 H), 1.47-1.11 ppm (9.8 H). The melting point was 137° C. and the decomposition temperature (mass loss of 5 wt %) was 331° C. Gel permeation chromatography indicated a Mw of 47876 and a PDI of 2.0.

The invention claimed is:

1. A reaction product of furandicarboxylic acid, at least one diol, and at least one C2-C3 dicarboxlic acid or hydroxy fatty acid with a catalyst.

2. The reaction product of claim 1 wherein said furandicarboxylic acid is an isomer selected from 2,5-furandicarboxylic acid, 2,4-furandicarboxylic acid, 2,3-furandicarboxylic acid or a diester of the acid selected from dimethyl ester furandicarboxylate or diethyl ester furandicarboxylate.

3. The polymer of claim 1 wherein said diol is an aliphatic hydrocarbon diol or a cyclicdiol and said C2-C3 dicarboxylic acid is oxalic acid or malonic acid or esters of said oxalic acid or malonic acid.

4. A process of making a polymer comprising
    a. providing a mixture of at least one furandicarboxylic acid, at least one diol, and at least one C2-C3 dicarboxlic acid, ester derivatives of C2-C3 dicarboxylic acid, hydroxy fatty acid or ester derivative of a hydroxy fatty
    b. adding a catalyst and
    c. processing said mixture at reaction conditions comprising a pressure from less than ambient pressure to 100 atm until a polymer product is produced.

5. The process of claim 4 wherein said furandicarboxylic acid is an isomer of furandicarboxylic acid or a diester of furandicarboxylic acid.

6. The process of claim 4 wherein said isomer of furandicarboxylic is selected from 2,5-furandicarboxylic acid, 2,4-furandicarboxylic acid, and 2,3-furandicarboxylic acid.

7. The process of claim 5 wherein said diester of furandicarboxylic comprises dimethylester furandicarboxylate or diethyl ester furandicarboxylate.

8. The process of claim 4 wherein said diol is an aliphatic hydrocarbon diol, a cyclic diol or mixtures thereof.

9. The process of claim 4 wherein said aliphatic hydrocarbon diol is selected from ethylene glycol, propylene glycol, and butane diol said cyclic diol is cyclohexanediol.

10. The process of claim 4 wherein said C2-C3 dicarboxylic acid comprises oxalic acidor malonic acid or esters of said oxalic acid or malonic acid.

11. The process of claim 4 wherein said hydroxy fatty acid is selected from 3-hydroxyvaleric acid, 4-hydroxybutryic acid, ricinoleic acid, 12-hydroxymadecanoic acid, 16-hydroxyhexadecanoic acid, 17-hydroxyoctadecanoic acid, 9,10-epoxy-18-hydroxyoctadecanoic acid, and 9,10,18-trihydroxyoctadecanoic acid.

12. The process of claim 4 wherein said reaction conditions comprise a temperature from about 100° C. to 350° C.

13. The process of claim 4 wherein said catalysts are selected from metal oxides and metal alkoxide catalysts.

14. The process of claim 13 wherein said metal alkoxides are selected from titanium alkoxides, tin alkoxides, germanium alkoxides, antimony alkoxides and mixtures thereof.

15. The process of claim 13 wherein said metal alkoxide catalysts are selected from ethoxides, propoxides, isopropoxides, butoxides, iso-butoxides and tert-butoxides.

16. The process of claim 4 wherein said process has a duration of from 1 minute to 24 hours.

17. The process of claim 4 wherein said furandicarboxylic acid and said C2-C3 dicarboxylic acid or the hydroxy fatty acid are present at a mol ratio of from 0.01:1 to 1:0.1.

18. The process of claim 4 wherein said process is a continuous, semi batch or batch process.

* * * * *